(12) United States Patent
Case

(10) Patent No.: US 9,885,845 B2
(45) Date of Patent: Feb. 6, 2018

(54) MODULE AND ASSEMBLY FOR FIBER OPTIC INTERCONNECTIONS

(71) Applicant: CommScope, Inc. of North Carolina, Hickory, NC (US)

(72) Inventor: Richard L. Case, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 14/995,966

(22) Filed: Jan. 14, 2016

(65) Prior Publication Data

US 2016/0209614 A1 Jul. 21, 2016

Related U.S. Application Data

(60) Provisional application No. 62/103,850, filed on Jan. 15, 2015.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01)

(58) Field of Classification Search
CPC ................ G02B 6/3897; G02B 6/4452
See application file for complete search history.

(56) References Cited

U.S. PATENT DOCUMENTS

| | | | | |
|---|---|---|---|---|
| 2,773,940 A | * | 12/1956 | Lebedinsky | H04Q 1/04 370/200 |
| 3,833,840 A | * | 9/1974 | Sinden | H04Q 1/142 361/730 |
| 4,510,565 A | * | 4/1985 | Dummermuth | G05B 19/4147 700/169 |
| 4,536,052 A | * | 8/1985 | Baker | H04Q 1/06 361/827 |
| 4,824,196 A | * | 4/1989 | Bylander | G02B 6/3821 385/134 |
| 4,989,317 A | * | 2/1991 | Firl | B41J 2/14072 174/535 |
| 5,093,885 A | * | 3/1992 | Anton | G02B 6/4452 385/134 |
| 5,175,673 A | * | 12/1992 | Roger | H04Q 1/14 174/382 |
| 5,289,558 A | * | 2/1994 | Teichler | G02B 6/4452 174/50 |
| 5,323,454 A | * | 6/1994 | Shay | H02G 15/076 174/59 |
| 5,401,193 A | * | 3/1995 | Lo Cicero | H01R 13/518 361/823 |
| 5,420,958 A | * | 5/1995 | Henson | G02B 6/3806 385/135 |

(Continued)

FOREIGN PATENT DOCUMENTS

| | | | | |
|---|---|---|---|---|
| JP | 2001119177 A | * | 4/2001 | |
| WO | WO 2009045396 A2 | * | 4/2009 | ........... G02B 6/4454 |

(Continued)

*Primary Examiner* — Peter Radkowski
(74) *Attorney, Agent, or Firm* — Merchant & Gould P.C.

(57) ABSTRACT

A module for interconnecting fiber optic cables and/or cords includes: a housing having a rear wall; a plurality of MPO adapters mounted in the rear wall; and forty-eight fiber optic adapters mounted to a front portion of the housing, the duplex adapters being operatively connected with the MPO adapters.

10 Claims, 5 Drawing Sheets

(56) References Cited

U.S. PATENT DOCUMENTS

| | | | | |
|---|---|---|---|---|
| 5,448,675 A | * | 9/1995 | Leone | G02B 6/43 324/66 |
| 5,461,693 A | * | 10/1995 | Pimpinella | G02B 6/4452 385/134 |
| 5,473,717 A | * | 12/1995 | Baptiste | G02B 6/3897 385/56 |
| 5,511,144 A | * | 4/1996 | Hawkins | G02B 6/4452 385/134 |
| 5,566,836 A | * | 10/1996 | Lerman | H05K 7/186 211/189 |
| 5,575,668 A | * | 11/1996 | Timmerman | A47B 21/06 174/482 |
| 5,613,030 A | * | 3/1997 | Hoffer | G02B 6/4452 385/135 |
| 5,638,481 A | * | 6/1997 | Arnett | G02B 6/3817 385/135 |
| 5,639,261 A | * | 6/1997 | Rutkowski | G02B 6/4452 439/31 |
| 5,642,447 A | * | 6/1997 | Pan | G02B 6/2746 385/11 |
| 5,659,648 A | * | 8/1997 | Knapp | G02B 6/1221 385/129 |
| 5,659,650 A | * | 8/1997 | Arnett | G02B 6/3817 385/135 |
| 5,664,955 A | * | 9/1997 | Arnett | G02B 6/3817 174/67 |
| 5,708,742 A | * | 1/1998 | Beun | G02B 6/3897 385/134 |
| 5,712,942 A | * | 1/1998 | Jennings | H04B 10/079 385/134 |
| 5,734,776 A | * | 3/1998 | Puetz | G02B 6/4442 385/134 |
| 5,737,475 A | * | 4/1998 | Regester | G02B 6/4454 385/134 |
| 5,788,087 A | * | 8/1998 | Orlando | H04Q 1/13 211/26 |
| 5,793,909 A | * | 8/1998 | Leone | H04B 10/071 385/134 |
| 5,901,033 A | * | 5/1999 | Crawford | H02B 1/32 174/51 |
| 5,959,767 A | * | 9/1999 | Fatehi | H04Q 11/0005 359/337.11 |
| 5,969,294 A | * | 10/1999 | Eberle | G02B 6/3825 174/57 |
| 5,984,720 A | * | 11/1999 | Milner | G02B 6/3897 439/534 |
| 6,024,610 A | * | 2/2000 | Schaffer | G02B 6/4452 439/719 |
| 6,088,497 A | * | 7/2000 | Phillips | G02B 6/28 385/134 |
| 6,175,079 B1 | * | 1/2001 | Johnston | G02B 6/4452 174/50 |
| 6,195,493 B1 | * | 2/2001 | Bridges | G02B 6/4452 385/134 |
| 6,208,796 B1 | * | 3/2001 | Williams Vigliaturo | G02B 6/4453 324/66 |
| 6,215,938 B1 | * | 4/2001 | Reitmeier | G02B 6/4441 385/134 |
| 6,250,816 B1 | * | 6/2001 | Johnston | G02B 6/3897 385/135 |
| 6,259,850 B1 | * | 7/2001 | Crosby, Jr. | G02B 6/3807 385/134 |
| 6,278,829 B1 | * | 8/2001 | BuAbbud | G02B 6/4452 385/135 |
| 6,293,707 B1 | * | 9/2001 | Wild | G02B 6/3897 385/55 |
| 6,327,059 B1 | * | 12/2001 | Bhalla | H04Q 11/0005 398/163 |
| 6,424,781 B1 | * | 7/2002 | Puetz | G02B 6/4452 385/135 |
| 6,487,356 B1 | * | 11/2002 | Harrison | G02B 6/4452 385/135 |
| 6,489,565 B1 | * | 12/2002 | Krietzman | H02G 3/045 174/101 |
| 6,524,134 B2 | * | 2/2003 | Flickinger | H05K 9/0058 439/607.2 |
| 6,535,682 B1 | * | 3/2003 | Puetz | G02B 6/4452 385/135 |
| 6,537,106 B1 | * | 3/2003 | Follingstad | H01R 13/518 439/534 |
| 6,565,260 B2 | * | 5/2003 | Belaidi | G02B 6/4466 385/135 |
| 6,579,014 B2 | * | 6/2003 | Melton | G02B 6/3825 385/55 |
| 6,584,267 B1 | * | 6/2003 | Caveney | G02B 6/4452 385/134 |
| 6,587,630 B2 | * | 7/2003 | Spence | G02B 6/4471 385/134 |
| 6,616,344 B1 | * | 9/2003 | Van Deventer | H04Q 11/0005 385/135 |
| 6,631,237 B2 | * | 10/2003 | Knudsen | G02B 6/4452 174/50 |
| 6,668,127 B1 | * | 12/2003 | Mahony | G02B 6/4451 385/135 |
| 6,758,600 B2 | * | 7/2004 | Del Grosso | G02B 6/4471 385/59 |
| 6,760,531 B1 | * | 7/2004 | Solheid | G02B 6/4452 385/135 |
| 6,761,585 B2 | * | 7/2004 | Clark | H01R 13/518 439/540.1 |
| 6,766,095 B1 | * | 7/2004 | Bjorklund | G02B 6/4452 385/135 |
| 6,804,447 B2 | * | 10/2004 | Smith | G02B 6/4453 385/134 |
| 6,809,258 B1 | * | 10/2004 | Dang | H02G 15/117 174/50 |
| 6,824,312 B2 | * | 11/2004 | McClellan | H05K 7/1448 385/53 |
| 6,850,685 B2 | * | 2/2005 | Tinucci | G02B 6/4455 385/134 |
| 6,866,541 B2 | * | 3/2005 | Barker | G02B 6/4452 439/540.1 |
| 6,869,227 B2 | * | 3/2005 | Del Grosso | G02B 6/4471 385/71 |
| 6,870,095 B1 | * | 3/2005 | Whitted | H04Q 1/066 174/135 |
| 6,881,076 B2 | * | 4/2005 | Baker | H04Q 1/146 333/260 |
| 6,885,564 B2 | * | 4/2005 | Hockett | G06F 1/181 174/50 |
| 6,916,199 B2 | * | 7/2005 | Follingstad | H01R 13/518 385/75 |
| 6,944,389 B2 | * | 9/2005 | Giraud | G02B 6/4455 385/134 |
| 6,955,479 B2 | * | 10/2005 | Erdman | G02B 6/3871 385/78 |
| 6,974,348 B2 | * | 12/2005 | Bentley | H04Q 1/13 439/540.1 |
| 6,980,725 B1 | * | 12/2005 | Swieconek | G02B 6/4452 385/135 |
| 6,981,893 B2 | * | 1/2006 | Barker | G02B 6/4452 439/540.1 |
| 6,983,095 B2 | * | 1/2006 | Reagan | G02B 6/4452 385/135 |
| 7,070,459 B2 | * | 7/2006 | Denovich | H04Q 1/13 385/134 |
| 7,088,899 B2 | * | 8/2006 | Reagan | G02B 6/4452 385/135 |
| 7,094,095 B1 | * | 8/2006 | Caveney | G02B 6/3897 385/134 |
| 7,103,255 B2 | * | 9/2006 | Reagan | G02B 6/4452 385/135 |
| 7,118,286 B2 | * | 10/2006 | Gurreri | G02B 6/3831 385/58 |
| 7,142,764 B2 | * | 11/2006 | Allen | G02B 6/4454 385/134 |

(56) References Cited

U.S. PATENT DOCUMENTS

| | | | | |
|---|---|---|---|---|
| 7,146,089 B2* | 12/2006 | Reagan | G02B 6/4452 | 385/135 |
| 7,147,383 B2* | 12/2006 | Sullivan | G02B 6/4472 | 385/55 |
| 7,171,102 B2* | 1/2007 | Reagan | G02B 6/4452 | 385/135 |
| 7,182,523 B2* | 2/2007 | Abendschein | G02B 6/3831 | 385/56 |
| 7,188,415 B2* | 3/2007 | Robinson | G02B 6/4471 | 174/154 |
| 7,200,317 B2* | 4/2007 | Reagan | G02B 6/4452 | 385/134 |
| 7,207,835 B2* | 4/2007 | Levesque | H04Q 1/066 | 439/540.1 |
| 7,220,145 B2* | 5/2007 | Denovich | G02B 6/4452 | 439/540.1 |
| 7,233,731 B2* | 6/2007 | Solheid | G02B 6/3849 | 385/135 |
| 7,244,144 B2* | 7/2007 | Follingstad | H01R 13/518 | 439/534 |
| 7,300,308 B2* | 11/2007 | Laursen | G02B 6/3897 | 439/540.1 |
| 7,302,153 B2* | 11/2007 | Thom | G02B 6/4452 | 385/134 |
| 7,306,468 B2* | 12/2007 | Baker | H04Q 1/146 | 439/620.08 |
| 7,315,681 B2* | 1/2008 | Kewitsch | G02B 6/4457 | 385/135 |
| 7,325,976 B2* | 2/2008 | Gurreri | G02B 6/3831 | 385/58 |
| 7,335,056 B1* | 2/2008 | Clark | H01R 13/518 | 439/534 |
| 7,357,667 B2* | 4/2008 | Clark | H04Q 1/136 | 439/540.1 |
| 7,367,823 B2* | 5/2008 | Rapp | G02B 6/4453 | 439/137 |
| 7,393,243 B2* | 7/2008 | Caveney | H01R 25/16 | 439/540.1 |
| 7,416,347 B2* | 8/2008 | Livingston | G02B 6/3831 | 385/53 |
| 7,439,449 B1* | 10/2008 | Kumar | G02B 6/4292 | 174/254 |
| 7,455,548 B2* | 11/2008 | Clark | H01R 13/518 | 439/247 |
| 7,457,503 B2* | 11/2008 | Solheid | G02B 6/3849 | 385/135 |
| 7,488,205 B2* | 2/2009 | Spisany | H04Q 1/13 | 385/135 |
| 7,563,102 B2* | 7/2009 | Nordin | H04Q 1/136 | 439/49 |
| 7,623,749 B2* | 11/2009 | Reagan | G02B 6/4452 | 385/135 |
| 7,651,277 B2* | 1/2010 | Gurreri | B29D 11/0075 | 385/58 |
| 7,668,430 B2* | 2/2010 | McClellan | H05K 7/1448 | 385/134 |
| 7,689,079 B2* | 3/2010 | Burnham | G02B 6/4453 | 385/15 |
| 7,760,516 B2* | 7/2010 | Johnson, Jr. | H05K 7/1457 | 361/600 |
| 7,762,839 B2* | 7/2010 | Chen | H01R 4/2416 | 439/540.1 |
| 7,821,792 B2* | 10/2010 | Belady | H05K 1/14 | 361/679.01 |
| 7,844,159 B2* | 11/2010 | Solheid | G02B 6/3849 | 385/135 |
| 7,874,869 B2* | 1/2011 | Chern | H01R 13/518 | 439/540.1 |
| 7,945,138 B2* | 5/2011 | Hill | G02B 6/4454 | 385/135 |
| 8,014,171 B2* | 9/2011 | Kelly | H04Q 1/064 | 361/810 |
| 8,203,450 B2* | 6/2012 | German | G02B 6/3895 | 340/10.1 |
| 8,410,364 B2* | 4/2013 | Dunwoody | H05K 7/1491 | 174/68.1 |
| 8,576,580 B2* | 11/2013 | Kelly | H04Q 1/064 | 361/825 |
| 9,042,699 B2* | 5/2015 | Barry | G02B 6/4452 | 361/826 |
| 2001/0001270 A1* | 5/2001 | Williams Vigliaturo | G02B 6/4453 | 385/135 |
| 2002/0125800 A1* | 9/2002 | Knudsen | G02B 6/4452 | 312/223.6 |
| 2002/0181896 A1* | 12/2002 | McClellan | H05K 7/1448 | 385/88 |
| 2003/0113086 A1* | 6/2003 | Jun | G02B 6/3897 | 385/135 |
| 2003/0129871 A1* | 7/2003 | Follingstad | H01R 13/518 | 439/534 |
| 2003/0174996 A1* | 9/2003 | Henschel | G02B 6/2804 | 385/135 |
| 2003/0185535 A1* | 10/2003 | Tinucci | G02B 6/4455 | 385/134 |
| 2003/0194187 A1* | 10/2003 | Simmons | B60R 16/0215 | 385/53 |
| 2004/0022494 A1* | 2/2004 | Liddle | G02B 6/3636 | 385/48 |
| 2004/0086252 A1* | 5/2004 | Smith | G02B 6/4453 | 385/135 |
| 2004/0114326 A1* | 6/2004 | Dodgen | H05K 7/206 | 361/694 |
| 2004/0184741 A1* | 9/2004 | Del Grosso | G02B 6/4471 | 385/71 |
| 2004/0209515 A1* | 10/2004 | Caveney | H01R 13/518 | 439/540.1 |
| 2005/0002633 A1* | 1/2005 | Solheid | G02B 6/3849 | 385/135 |
| 2005/0105873 A1* | 5/2005 | Reagan | G02B 6/4452 | 385/135 |
| 2005/0111800 A1* | 5/2005 | Cooke | G02B 6/4473 | 385/100 |
| 2005/0129375 A1* | 6/2005 | Elkins, II | G02B 6/4472 | 385/100 |
| 2005/0129379 A1* | 6/2005 | Reagan | G02B 6/4452 | 385/135 |
| 2005/0135770 A1* | 6/2005 | McClellan | H05K 7/1448 | 385/135 |
| 2005/0146828 A1* | 7/2005 | Baker | H04Q 1/146 | 361/119 |
| 2005/0175308 A1* | 8/2005 | Elkins, II | G02B 6/4472 | 385/135 |
| 2005/0191010 A1* | 9/2005 | Gurreri | G02B 6/3831 | 385/58 |
| 2005/0207134 A1* | 9/2005 | Belady | H05K 1/14 | 361/796 |
| 2005/0220393 A1* | 10/2005 | Riester | G02B 6/4201 | 385/15 |
| 2006/0008231 A1* | 1/2006 | Reagan | G02B 6/3849 | 385/135 |
| 2006/0029334 A1* | 2/2006 | Quinby | G02B 6/3851 | 385/59 |
| 2006/0063436 A1* | 3/2006 | Gurreri | G02B 6/3831 | 439/680 |
| 2006/0133736 A1* | 6/2006 | Sullivan | G02B 6/4472 | 385/59 |
| 2006/0165365 A1* | 7/2006 | Feustel | G02B 6/4452 | 385/135 |
| 2006/0165366 A1* | 7/2006 | Feustel | G02B 6/2804 | 385/135 |
| 2006/0193591 A1* | 8/2006 | Rapp | G02B 6/4453 | 385/137 |
| 2006/0203460 A1* | 9/2006 | Aviv | H05K 7/1492 | 361/788 |
| 2006/0269208 A1* | 11/2006 | Allen | G02B 6/4471 | 385/135 |

(56) References Cited

U.S. PATENT DOCUMENTS

| | | | |
|---|---|---|---|
| 2007/0025674 A1* | 2/2007 | Kowalczyk | G02B 6/3849 385/134 |
| 2007/0058641 A1* | 3/2007 | Cicchetti | H04L 49/357 370/400 |
| 2007/0104449 A1* | 5/2007 | Thom | G02B 6/4452 385/136 |
| 2007/0131628 A1* | 6/2007 | Mimlitch, III | A47B 47/024 211/26 |
| 2007/0165995 A1* | 7/2007 | Reagan | G02B 6/4452 385/135 |
| 2007/0184712 A1* | 8/2007 | Martich | H01R 13/74 439/540.1 |
| 2007/0189693 A1* | 8/2007 | Smrha | G02B 6/4452 385/135 |
| 2008/0008436 A1* | 1/2008 | Reagan | G02B 6/3849 385/135 |
| 2008/0008437 A1* | 1/2008 | Reagan | G02B 6/3849 385/135 |
| 2008/0013910 A1* | 1/2008 | Reagan | G02B 6/3849 385/135 |
| 2008/0025683 A1* | 1/2008 | Murano | G02B 6/4453 385/135 |
| 2008/0055847 A1* | 3/2008 | Belady | H05K 1/14 361/679.49 |
| 2008/0075411 A1* | 3/2008 | Solheid | G02B 6/3849 385/135 |
| 2008/0090433 A1* | 4/2008 | Murano | G02B 6/3831 439/131 |
| 2008/0096438 A1* | 4/2008 | Clark | H01R 13/518 439/713 |
| 2008/0115956 A1* | 5/2008 | Fransen | H05K 7/186 174/66 |
| 2008/0146079 A1* | 6/2008 | Spisany | H04Q 1/13 439/540.1 |
| 2008/0151524 A1* | 6/2008 | Kelly | H04Q 1/064 361/826 |
| 2008/0152292 A1* | 6/2008 | Wilken | G02B 6/4452 385/135 |
| 2008/0175551 A1* | 7/2008 | Smrha | G02B 6/4452 385/135 |
| 2008/0176445 A1* | 7/2008 | Shifris | H01R 9/2416 439/540.1 |
| 2008/0247723 A1* | 10/2008 | Herzog | G02B 6/4452 385/135 |
| 2009/0016043 A1* | 1/2009 | Hruby | G02B 6/4452 361/827 |
| 2009/0074372 A1* | 3/2009 | Solheid | G02B 6/3849 385/135 |
| 2009/0163043 A1* | 6/2009 | Demers | G02B 6/4452 439/43 |
| 2009/0166404 A1* | 7/2009 | German | G02B 6/3895 235/375 |
| 2009/0180737 A1* | 7/2009 | Burnham | G02B 6/4453 385/59 |
| 2009/0185782 A1* | 7/2009 | Parikh | G02B 6/4442 385/135 |
| 2009/0196563 A1* | 8/2009 | Mullsteff | G02B 6/4453 385/135 |
| 2009/0236117 A1* | 9/2009 | Garza | H04Q 1/09 174/100 |
| 2009/0245743 A1* | 10/2009 | Cote | G02B 6/4454 385/135 |
| 2009/0283488 A1* | 11/2009 | McMillan, III | H05K 7/186 211/183 |
| 2009/0317045 A1* | 12/2009 | Reagan | G02B 6/4452 385/135 |
| 2010/0006317 A1* | 1/2010 | Hruby | G02B 6/4459 174/97 |
| 2010/0027953 A1* | 2/2010 | Russell | G02B 6/4452 385/135 |
| 2010/0061691 A1* | 3/2010 | Murano | G02B 6/4452 385/135 |
| 2010/0129040 A1* | 5/2010 | Zamzow | G02B 6/4452 385/135 |
| 2010/0142910 A1* | 6/2010 | Hill | G02B 6/4454 385/135 |
| 2010/0158465 A1* | 6/2010 | Smrha | G02B 6/4453 385/135 |
| 2010/0159742 A1* | 6/2010 | Chen | H01R 4/2416 439/540.1 |
| 2010/0183270 A1* | 7/2010 | Davis | G02B 6/4471 385/100 |
| 2010/0202740 A1* | 8/2010 | Barlowe | G02B 6/4471 385/100 |
| 2010/0279519 A1* | 11/2010 | Mei | H01R 31/005 439/55 |
| 2010/0316334 A1* | 12/2010 | Kewitsch | G02B 6/3502 385/78 |
| 2010/0322554 A1* | 12/2010 | Barnes | G02B 6/0365 385/24 |
| 2010/0322581 A1* | 12/2010 | Cooke | G02B 6/4453 385/135 |
| 2010/0322583 A1* | 12/2010 | Cooke | G02B 6/4452 385/135 |
| 2011/0007470 A1* | 1/2011 | Belady | H05K 1/14 361/679.31 |
| 2011/0044020 A1* | 2/2011 | Hruby | G02B 6/4452 361/827 |
| 2011/0192631 A1* | 8/2011 | Burek | G02B 6/4452 174/101 |
| 2011/0286198 A1* | 11/2011 | Kelly | H04Q 1/064 361/826 |
| 2011/0299266 A1* | 12/2011 | Barry | G02B 6/4452 361/826 |
| 2011/0299822 A1* | 12/2011 | Barry | G02B 6/4452 385/135 |
| 2012/0019177 A1* | 1/2012 | Kaufmann | B25F 5/001 318/379 |
| 2012/0057836 A1* | 3/2012 | Andrzejewski | G02B 6/1228 385/135 |
| 2013/0308915 A1* | 11/2013 | Buff | G02B 6/4452 385/135 |

FOREIGN PATENT DOCUMENTS

| | | | | |
|---|---|---|---|---|
| WO | WO 2009045396 A9 * | 6/2009 | | G02B 6/4454 |
| WO | WO 2009089041 A1 * | 7/2009 | | G02B 6/3897 |
| WO | WO 2009091465 A2 * | 7/2009 | | G02B 6/4442 |
| WO | WO 2009091465 A3 * | 9/2009 | | G02B 6/4442 |
| WO | WO 2009045396 A3 * | 10/2009 | | G02B 6/4454 |
| WO | WO 2010024842 A1 * | 3/2010 | | G02B 6/4471 |

* cited by examiner

MODULE AND ASSEMBLY FOR FIBER OPTIC INTERCONNECTIONS

RELATED APPLICATION

The present application claims priority from and the benefit of U.S. Provisional Patent Application No. 62/103,850, filed Jan. 15, 2015, the disclosure of which is hereby incorporated herein in its entirety.

FIELD OF THE INVENTION

The present invention is directed to datacommunications equipment, and in particular datacommunications equipment for fiber optic interconnections.

BACKGROUND

A network patching system is typically used to interconnect the various communication lines within a closet or computer room. In a conventional network patching system, the communication lines are terminated within a closet in an organized manner via one or more patch panels mounted on a rack or frame. Multiple ports are included in the patch panel, typically in some type of organized array. Each of the different ports is connected with a communications line. In small patching systems, all communications lines may terminate on the patch panels of the same rack. In larger patching systems, multiple racks may be used, wherein different communications lines terminate on different racks. Interconnections between the various communications lines are made connecting patch cords to the ports. By selectively connecting the various communications lines with patch cords, any combination of communications lines can be interconnected.

It may be desirable to provide different devices for interconnecting datacommunications lines.

SUMMARY

As a first aspect, embodiments of the invention are directed to a module for interconnecting fiber optic cables and/or cords. The module comprises: a housing having a rear wall; a plurality of MPO adapters mounted in the rear wall; and forty-eight fiber optic adapters mounted to a front portion of the housing, the fiber optic adapters being operatively connected with the MPO adapters.

As a second aspect, embodiments of the invention are directed to an assembly for interconnecting fiber optic cables and/or cords comprising a 1 U telecommunications shelf and two fiber optic telecommunications modules mounted to the shelf. Each of the modules comprises: a housing having a rear wall; a plurality of MPO adapters mounted in the rear wall; and forty-eight fiber optic adapters mounted to a front portion of the housing, the fiber optic adapters being operatively connected with the MPO adapters.

As a third aspect, embodiments of the invention are directed to an assembly for interconnecting fiber optic cables and/or cords comprising a 1 U telecommunications shelf having a window with side edges and two fiber optic telecommunications modules mounted to the shelf. Each module comprises: a housing having a rear wall; a plurality of MPO adapters mounted in the rear wall; forty-eight fiber optic adapters mounted to a front portion of the housing, the fiber optic adapters being operatively connected with the MPO adapters; and latches that engage the side edges of the window to snap-mount the module to the shelf. Each of the modules is configured to be oriented in the shelf in an upright or an inverted orientation, and wherein each module further comprises a faceplate indicating the upright and inverted orientations.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
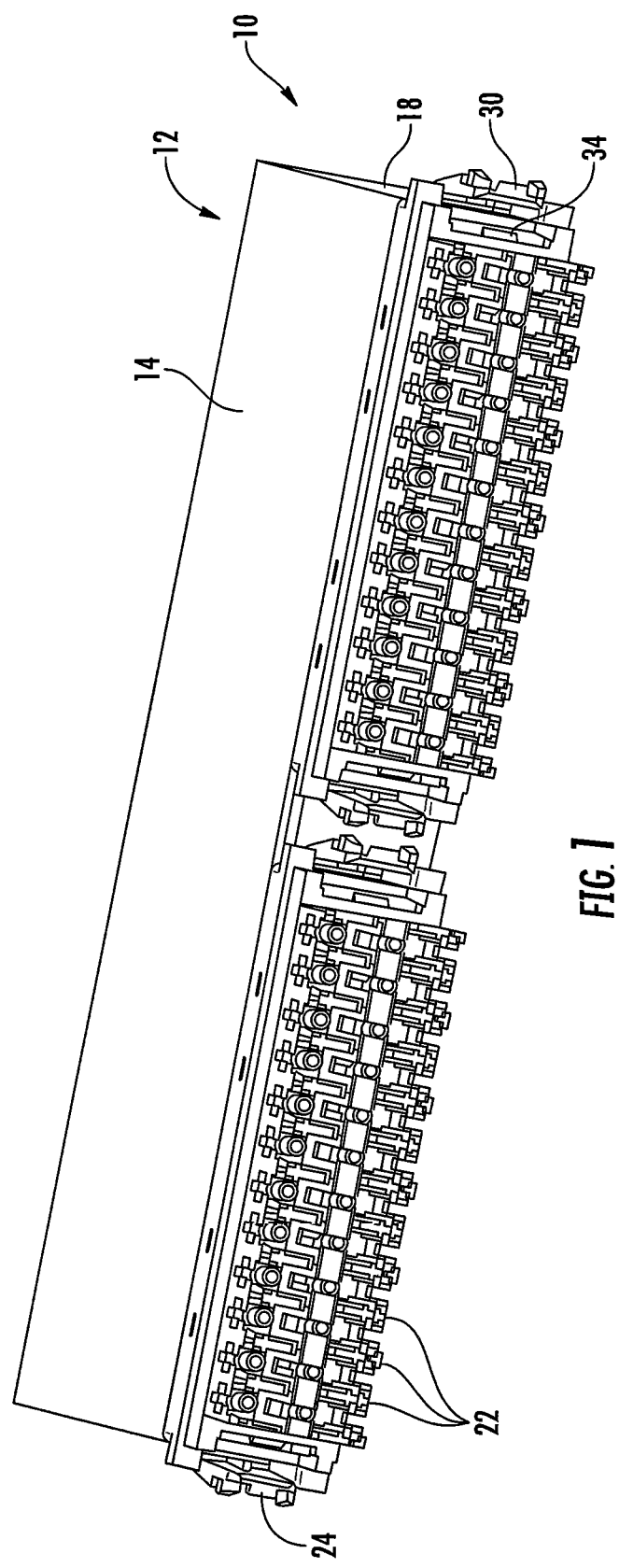
FIG. 1 is a front perspective view of a module for interconnecting fiber optic cables and cords according to embodiments of the invention.
Figure 2:
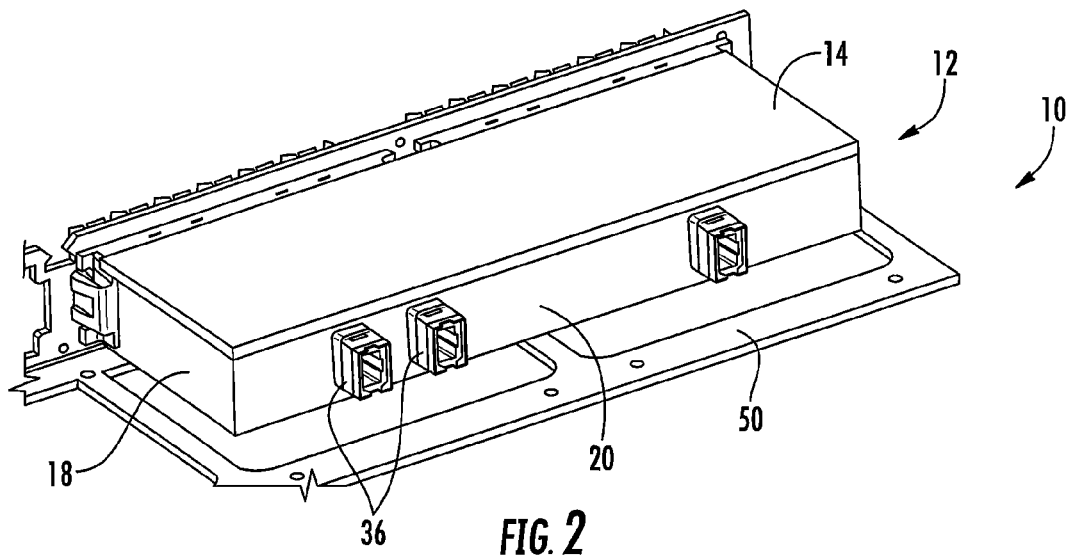
FIG. 2 is a rear perspective view of the module of FIG. 1.

Referring now to FIGS. 1 and 2, a telecommunications module for interconnecting fiber optic cables and cords, designated broadly at 10, is shown therein. The module 10 includes a box-like housing 12 with a ceiling 14, a floor (not shown), side walls 18, and a rear wall 20. The housing 12 is sized to mount on a shelf sized at 1 U (i.e., approximately 1.75 inches in height). On its front side, the module 10 includes two sets of 24 duplex fiber optic adapters 22. Each set of fiber optic adapters 22 is arranged in upper and lower rows of twelve adapters each, with the sets of adapters 22 being side-by-side across the front of the module 10. The adapters 22 are conventional fiber optic adapters and need not be described in detail herein.

Figure 3:
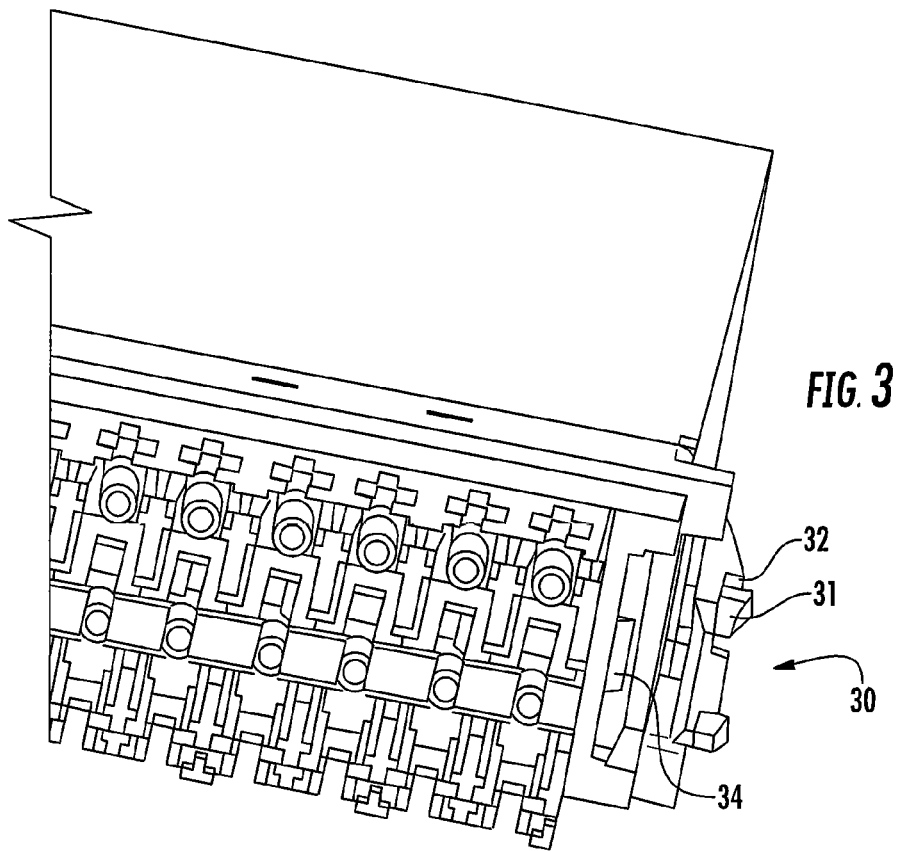
FIG. 3 is an enlarged partial front perspective view of one of the latches of the module of FIG. 1 used to attach the module to a fiber shelf.
Figure 4:
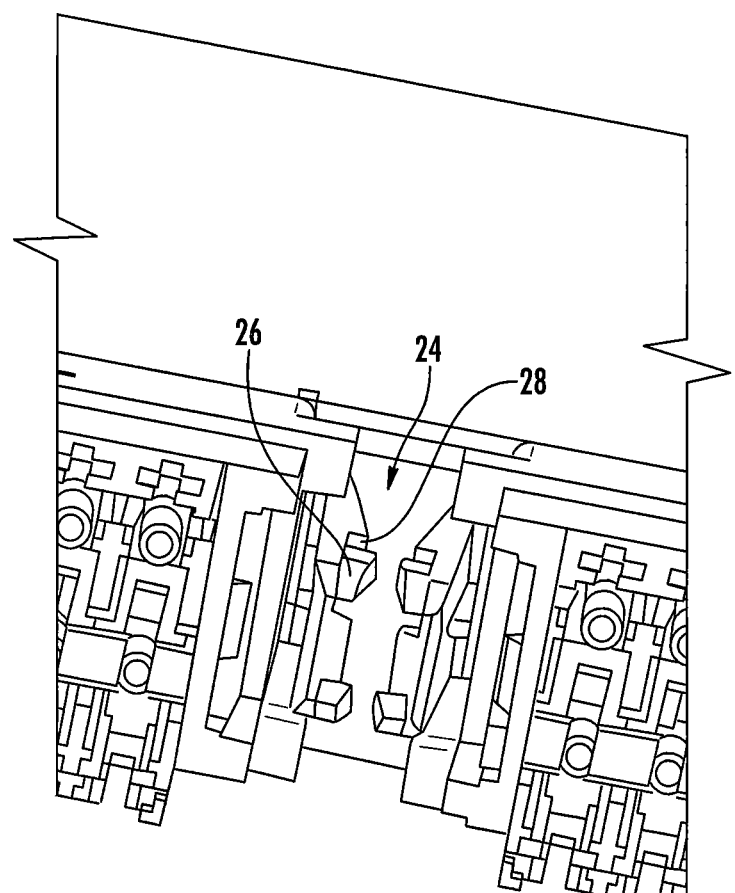
FIG. 4 is an enlarged partial front perspective view of another of the latches of the module of FIG. 1 used to attach the module to a fiber shelf.

Referring now to FIGS. 1 and 4, the front side of the module 10 also includes features that enable the module 10 to be attached to a 1 U fiber shelf 50. A pair of snap latches 24 are located between the sets of adapters 22 and project forwardly. Each of the snap latches 24 has a hook 26 and an opposed shoulder 28 that enables it to receive a vertical edge of the shelf 50. In addition, a latch 30 (FIG. 3) projects forwardly from each of the lateral edges of the module 10; each latch 30 includes a hook 31 and a shoulder 32 that can receive a vertical edge of the shelf 50.

Referring now to FIGS. 1 and 3, the front side of the module 10 also includes two latching projections 34 that are located on opposite sides of the sets of adapters 22. These latching projections 34 enable the module to mount a kit for "intelligent patching" (i.e., a system that can track connectivity of cords and cables connected to the adapters 22). An exemplary system/kit is the iPATCH® system, available from CommScope, Inc., (Hickory, N.C.).

Referring now to FIG. 2, three MPO connectors 36 are mounted to the rear wall 20 of the housing 12. These MPO connectors 36 are sixteen fiber connectors that receive a sixteen fiber MPO attached to a fiber optic cable.

The housing 12 protects optical fibers (not shown) that extend between the MPO connectors 36 and the adapters 22. There are multiple arrangements of such fibers known to those of skill in this art that need not be described in detail herein.

Figure 5:
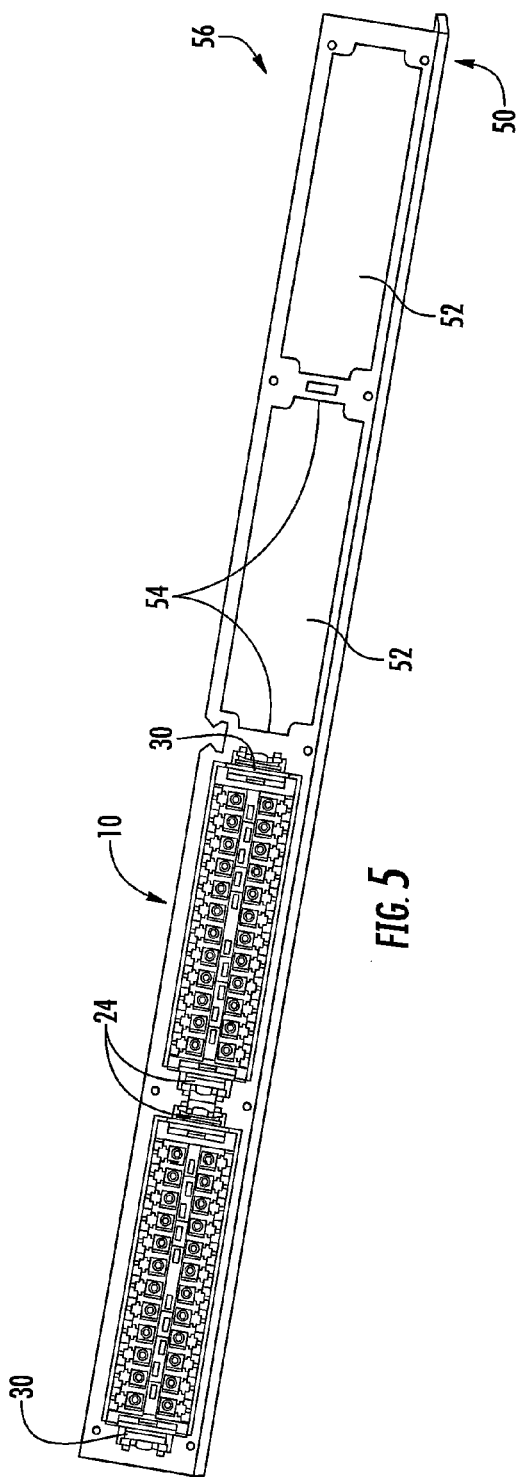
FIG. 5 is front perspective view of the module of FIG. 1 attached to a fiber shelf.

FIG. 5 illustrates the module 10 mounted in the shelf 50. As can be seen in FIG. 5, the shelf 50 includes four windows 52 with vertical side edges 54 (only two windows 52 are visible in FIG. 5). The module 10 is mounted on the shelf 50 by inserting the adapters 22 through the windows 50; the latches 24 contact the side edges 54 and deflect, then recover, as the module 10 is moved forward to snap-mount the module 10 on the shelf 50. The side edges 54 of the window 50 are captured between the hooks 26 and the shoulders 28 of the latches 24. Similarly, the latches 30 engage respective side edges 54 of the window 50 and deflect, then recover to capture the side edges 54 between the hooks 31 and the shoulders 32. The latching projections 34 are free to receive an intelligent patching kit if desired. The resulting assembly 56 comprising the shelf 50 and two modules 10 can be mounted within a 1 U space on a conventional telecommunications rack or cabinet.

Figure 6:
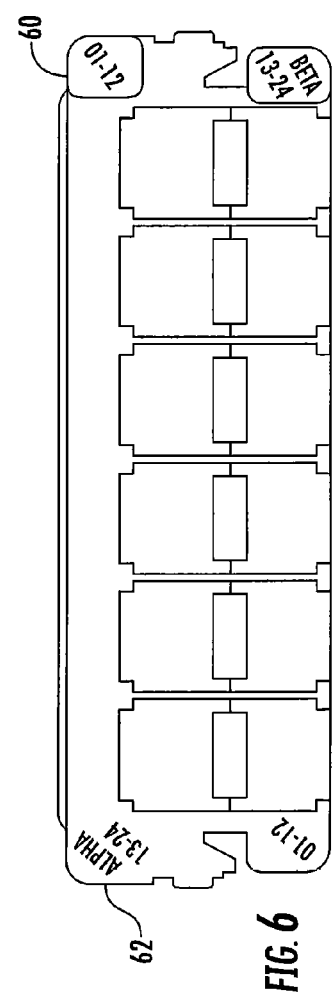
FIG. 6 is a front view of a labeling plate attached to the front side of the module of FIG. 1.

FIG. 6 shows the module 10 with a faceplate 60 attached thereto for assisting with orientation of the module 10. As discussed at length in U.S. Pat. No. 7,416,347, the disclosure of which is hereby incorporated herein in its entirety, fiber optic modules often have an "ALPHA" or "BETA" orientation in order to provide proper connectivity for the fibers connected thereto. The faceplate 60 includes indicia 62 that is oriented so that an operator can quickly discern an "ALPHA" or "BETA" configuration of the module 10 irrespective of whether the module 10 is horizontally or vertically oriented.

Figure 7:
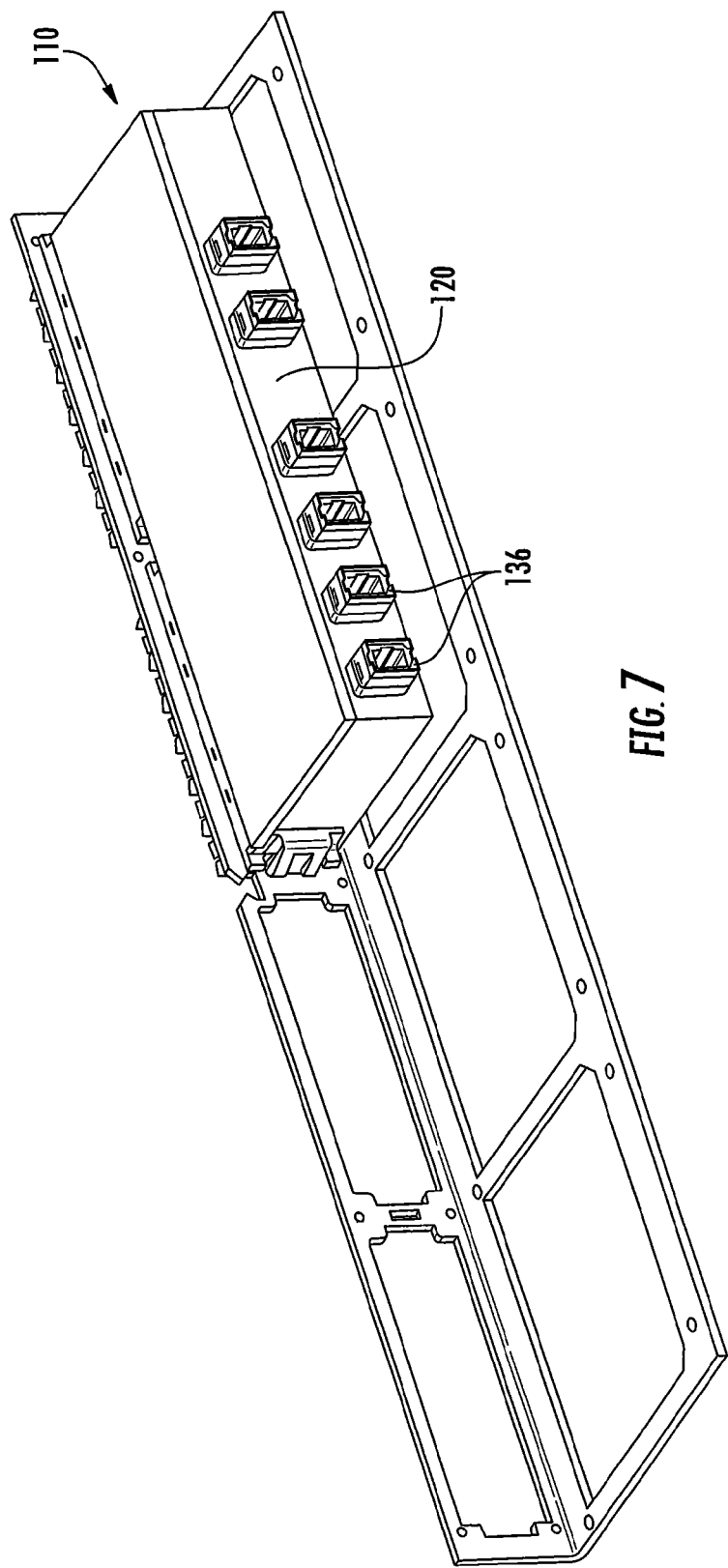
FIG. 7 is a rear perspective view of an alternative embodiment of a module for interconnecting fiber optic cables and cords.

FIG. 7 illustrates another fiber optic module 110 according to embodiments of the invention. The module 110 includes three TAP connectors 136 on its rear wall 120.

It should also be noted that, because the modules 10, 110 include 48 fiber optic adapters 22, they are configured to be able to receive either three 16-fiber MPOs or four 12-fiber MPOs. As such, the modules can be employed through transitions between 12-fiber based systems and 16-fiber based systems. Thus, as higher data transmission speeds (such as 40 Gb, 100 Gb, or even 400 Gb) become more standard and/or commonplace, the modules can be modified to address the changing needs of end users.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly for interconnecting fiber optic cables and/or cords, comprising:
   a 1 U telecommunications shelf; and
   two fiber optic telecommunications modules mounted to the shelf, each comprising:
   a housing having a rear wall;
   a plurality of MPO adapters mounted in the rear wall;
   forty-eight fiber optic adapters mounted to a front portion of the housing, the fiber optic adapters being operatively connected with the MPO adapters, wherein each module comprises a first set of latches that snap-mount the module to the shelf, wherein each module further comprises a second set of latches having a different configuration than the first set of latches, the second set of latches configured to allow the module to be snap-mounted to a piece of telecommunications equipment different than the telecommunications shelf, the second set of latches being configured such that the second set of latches are free to receive the piece of telecommunications equipment that is different than the telecommunications shelf when the module has been mounted to the telecommunications shelf with the first set of latches.

2. The assembly defined in claim 1, wherein the plurality of MPO adapters is three adapters.

3. The assembly defined in claim 1, wherein the plurality of MPO adapters is four adapters.

4. The assembly defined in claim 1, wherein each of the modules is configured to be oriented in an upright or an inverted orientation, and wherein each module further comprises a faceplate indicating the upright and inverted orientations.

5. The assembly defined in claim 1, wherein the shelf includes at least one window with side edges, and wherein the first set of latches of the modules engage the side edges of the window.

6. The assembly defined in claim 1, wherein the forty-eight fiber optic adapters comprise twenty-four duplex fiber optic adapters.

7. An assembly for interconnecting fiber optic cables and/or cords, comprising:
   a 1 U telecommunications shelf having a window with side edges; and
   two fiber optic telecommunications modules mounted to the shelf, each comprising:
   a housing having a rear wall;
   a plurality of MPO adapters mounted in the rear wall;
   forty-eight fiber optic adapters mounted to a front portion of the housing, the fiber optic adapters being operatively connected with the MPO adapters; and
   a first set of latches that engage the side edges of the window to snap-mount the module to the shelf and a second set of latches having a different configuration than the first set of latches, the second set of latches configured to allow the module to be snap-mounted to a piece of telecommunications equipment different than the telecommunications shelf, the second set of latches being configured such that the second set of latches are free to receive the piece of telecommunications equipment that is different than the telecommunications shelf when the module has been mounted to the telecommunications shelf with the first set of latches;

wherein each of the modules is configured to be oriented in the shelf in an upright or an inverted orientation, and wherein each module further comprises a faceplate indicating the upright and inverted orientations.

8. The assembly defined in claim 7, wherein the plurality of MPO adapters is three adapters.

9. The assembly defined in claim 7, wherein the plurality of MPO adapters is four adapters.

10. The assembly defined in claim 7, wherein the forty-eight fiber optic adapters comprise twenty-four duplex fiber optic adapters.

\* \* \* \* \*